(12) United States Patent
Kibler (10) Patent No.: US 10,549,788 B2
(45) Date of Patent: Feb. 4, 2020

(54) TRAILER HAVING OFFSET RIBS (71) Applicant: MAC TRAILER MANUFACTURING, INC., Alliance, OH (US)

(72) Inventor: Scott A. Kibler, Kensington, OH (US)

(73) Assignee: MAC Trailer Manufacturing, Inc., Alliance, OH (US)

( * ) Notice: Subject to any disclaimer, the term of this patent is extended or adjusted under 35 U.S.C. 154(b) by 128 days.

(21) Appl. No.: 15/710,904

(22) Filed: Sep. 21, 2017

(65) Prior Publication Data
US 2019/0084624 A1 Mar. 21, 2019

(51) Int. Cl.
B62D 25/20 (2006.01)
B60P 1/56 (2006.01)

(52) U.S. Cl.
CPC ............ *B62D 25/2054* (2013.01); *B60P 1/56* (2013.01)

(58) Field of Classification Search
CPC .. B60P 1/56; B60P 3/426; B60P 3/224; B60P 1/16; B60P 1/60; B60P 3/221; B60P 3/24; B60P 1/165; B62D 53/06; B62D 53/062; B62D 33/023; B62D 53/067; B62D 61/12; B62D 63/061

USPC ... 298/27, 24, 7, 8 H, 28, 1 R, 8 T, 5, 3, 25; 404/110, 108, 101, 107, 118, 75, 87, 98
See application file for complete search history.

(56) References Cited

U.S. PATENT DOCUMENTS

| 3,311,269 | A | * | 3/1967 | Mendez | B60P 1/60 222/195 |
| 3,543,693 | A | * | 12/1970 | Holt | B61D 3/188 410/65 |
| 6,457,630 | B1 | * | 10/2002 | Nilsson | B23K 31/02 228/184 |
| 8,684,448 | B2 | * | 4/2014 | Johnson | B62D 35/00 296/180.4 |
| 2015/0137501 | A1 | * | 5/2015 | Kibler | B60P 3/221 280/837 |

* cited by examiner

Primary Examiner — D Glenn Dayoan
Assistant Examiner — Sunsurraye Westbrook
(74) Attorney, Agent, or Firm — Sand, Sebolt & Wernow Co., LPA (57) ABSTRACT The current disclosure relates to a hopper trailer. The current disclosure is directed to a hopper trailer having an upper portion, a lower portion, and an offset rib, wherein the offset rib is fixedly attached on an upper surface of the upper portion of the hopper trailer. The lower portion comprises a plurality of hopper tanks, wherein an lower rib is placed between two adjacent hopper tanks. The offset rib on the upper portion of the hopper trailer is offset from the lower rib on the hopper tanks.

20 Claims, 6 Drawing Sheets

TRAILER HAVING OFFSET RIBS

BACKGROUND

Technical Field

Generally, the current disclosure relates to a hopper trailer. Specifically, the current disclosure is directed to a hopper trailer having offset ribs. More particularly, at least one offset rib is attached around an upper portion of the trailer to provide improved structural strength on surface of the hopper.

Background Information

A hopper trailer is designed to haul bulk commodity products such as various grains amongst other things. These trailers are used extensively throughout the United States to transport agricultural products as well as other commodities (i.e. coal, ore, sugar, or salt) that can be hauled in bulk and loaded and unloaded through the trailer. There are two main types of hopper trailers: covered hopper cars, which are equipped with a roof or cover, and open hopper cars, which do not have a roof. The covered hopper trailers are used for bulk cargo such as grain, sugar, and fertilizer that must be protected from exposure to the weather. The open hopper trailers are used for commodities such as coal, which can be exposed with less detrimental effect.

However, a hopper trailer found in the prior art may have stress issues along one or more vertical ribs which cover an upper surface of the hopper trailer. The rib assembly in the prior art is designed to have its vertical rib placed exactly along a vertical seam which is formed when two semi-cylinders are welded together. Due to the design of the rib assembly in the prior art, stress is concentrated at a location where the vertical rib meets with a horizontal rib. At this point, surface stress of the vertical rib increases, which may cause the rib assembly on the hopper trailer to fail due to the stress.

SUMMARY

Therefore, a new design of a rib assembly to reduce stress concentration on its vertical rib is needed. There is need for an improved design of a hopper trailer to reduce surface tensile strength so that the surface tensile strength of the hopper trailer is not focused on a point; rather it spreads widely out on the surface of the hopper trailer.

The current disclosure relates to a hopper trailer. The current disclosure is directed to a hopper trailer having an upper portion, a lower portion, and an offset rib, wherein the offset rib is fixedly attached on an upper surface of the upper portion of the hopper trailer. The lower portion comprises a plurality of hopper tanks, wherein an lower rib is placed between two adjacent hopper tanks. The offset rib on the upper portion of the hopper trailer is offset from the lower rib between the hopper tanks.

In one aspect, the current disclosure may provide a hopper tank trailer comprising an upper portion defining a top of the hopper tank trailer; a lower portion including a plurality of hopper funnels fixedly connected beneath the upper portion, a lower rib sandwiched between adjacent pairs of the hopper funnels, and an offset rib connected to the upper portion which is offset from the lower rib.

In another aspect, the current disclosure may provide a hopper tank trailer comprising an upper portion, at least one lower rib extending along a first axis, at least one upper rib extending along a second axis, a first funnel and a second funnel, wherein a lower portion of the at least one lower rib is sandwiched between the first funnel and the second funnel along the first axis, and wherein an upper portion of the at least one lower rib is attached to an lower surface of the upper portion along the first axis, and wherein the upper rib is offset from the lower rib.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

Similar numbers refer to similar parts throughout the drawings.

DETAILED DESCRIPTION

The present disclosure relates to a hopper trailer which has an upper portion and a lower portion with a rib assembly attached on a surface of the hopper trailer.

Figure 1:
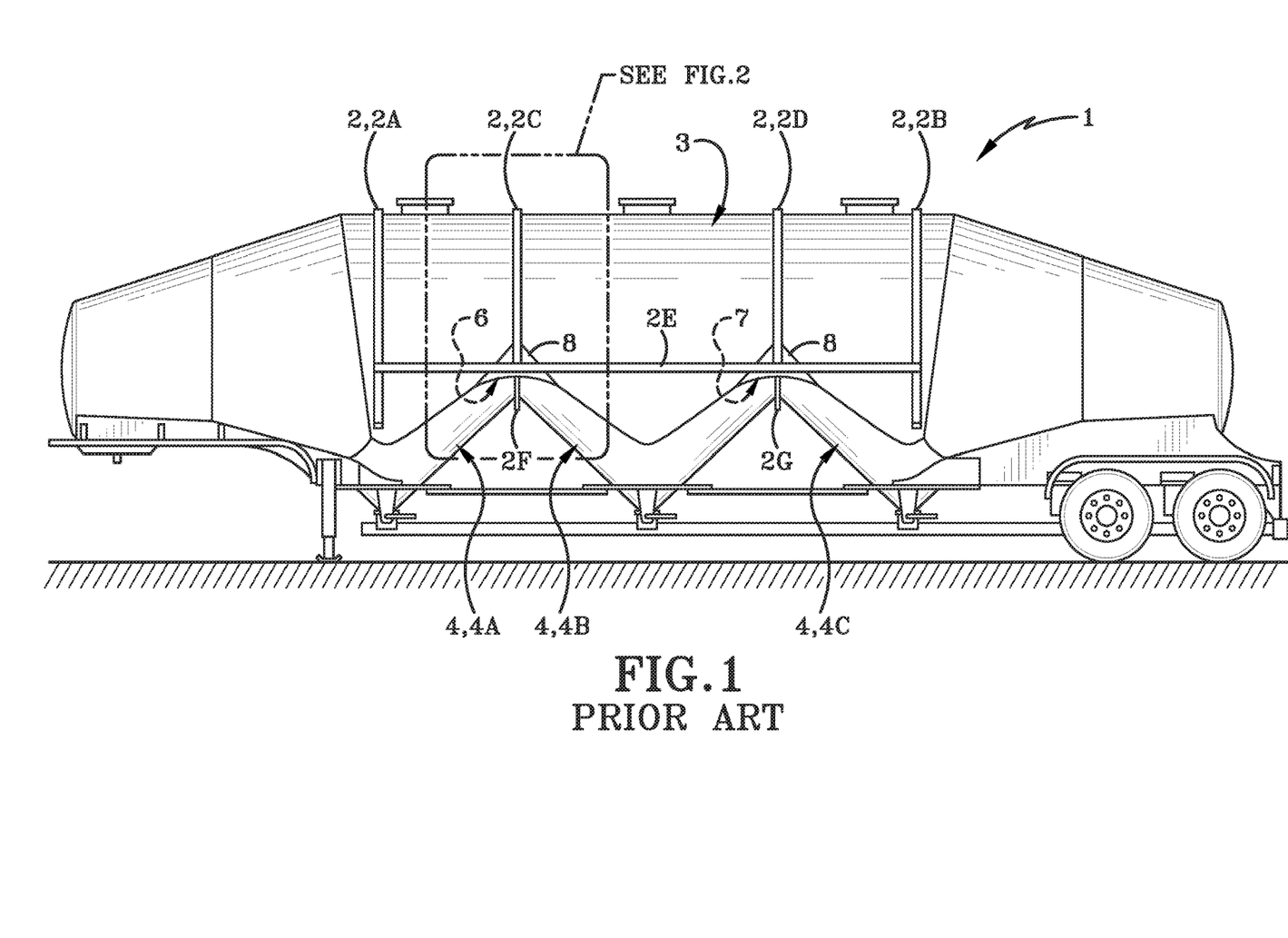
FIG. 1 is a side elevation view of a PRIOR Art example of a hopper trailer having an upper portion and lower portion.
Figure 2:
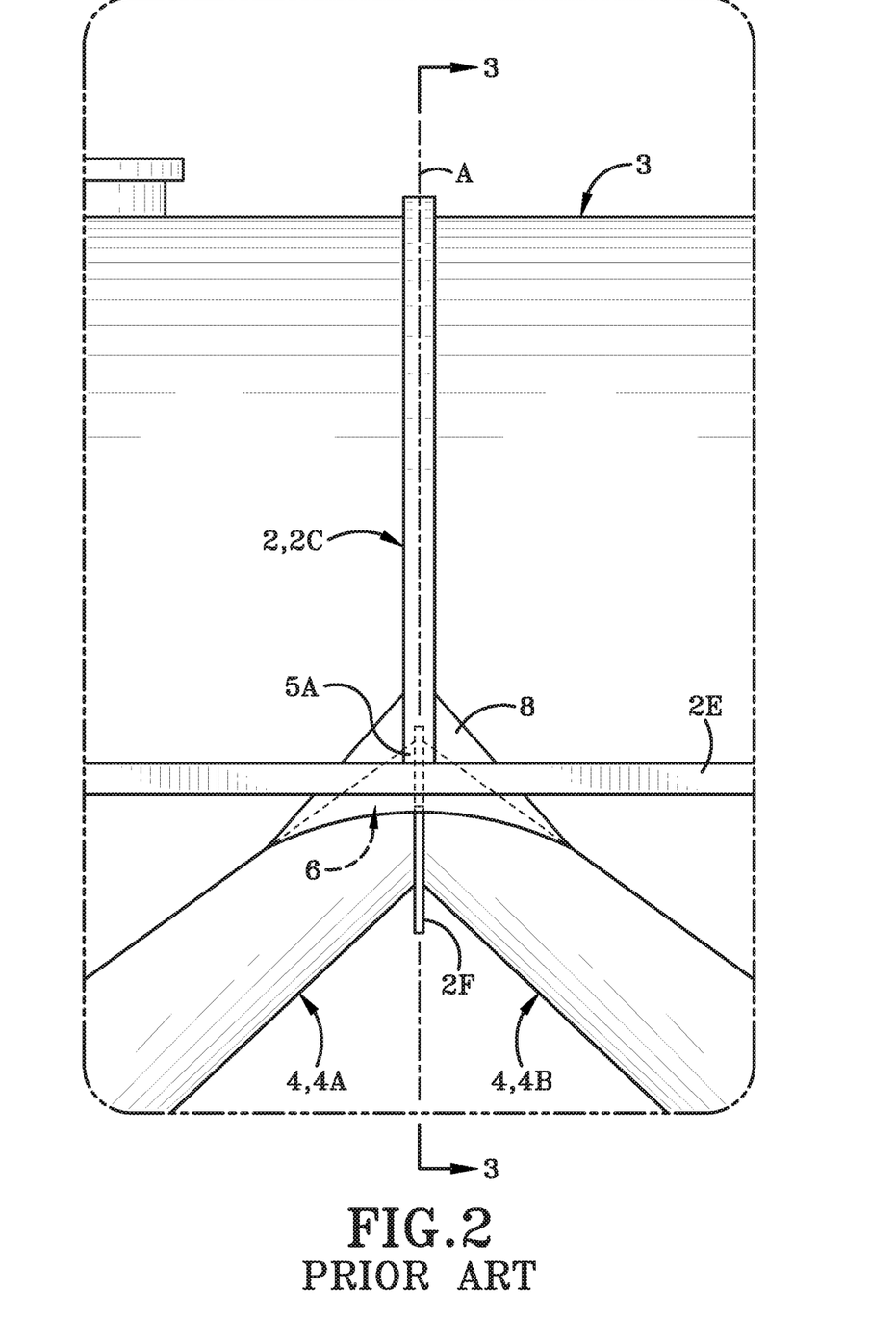
FIG. 2 is an enlarged side elevation view as taken from the region labeled "SEE FIG. 2" in FIG. 1.
Figure 3:
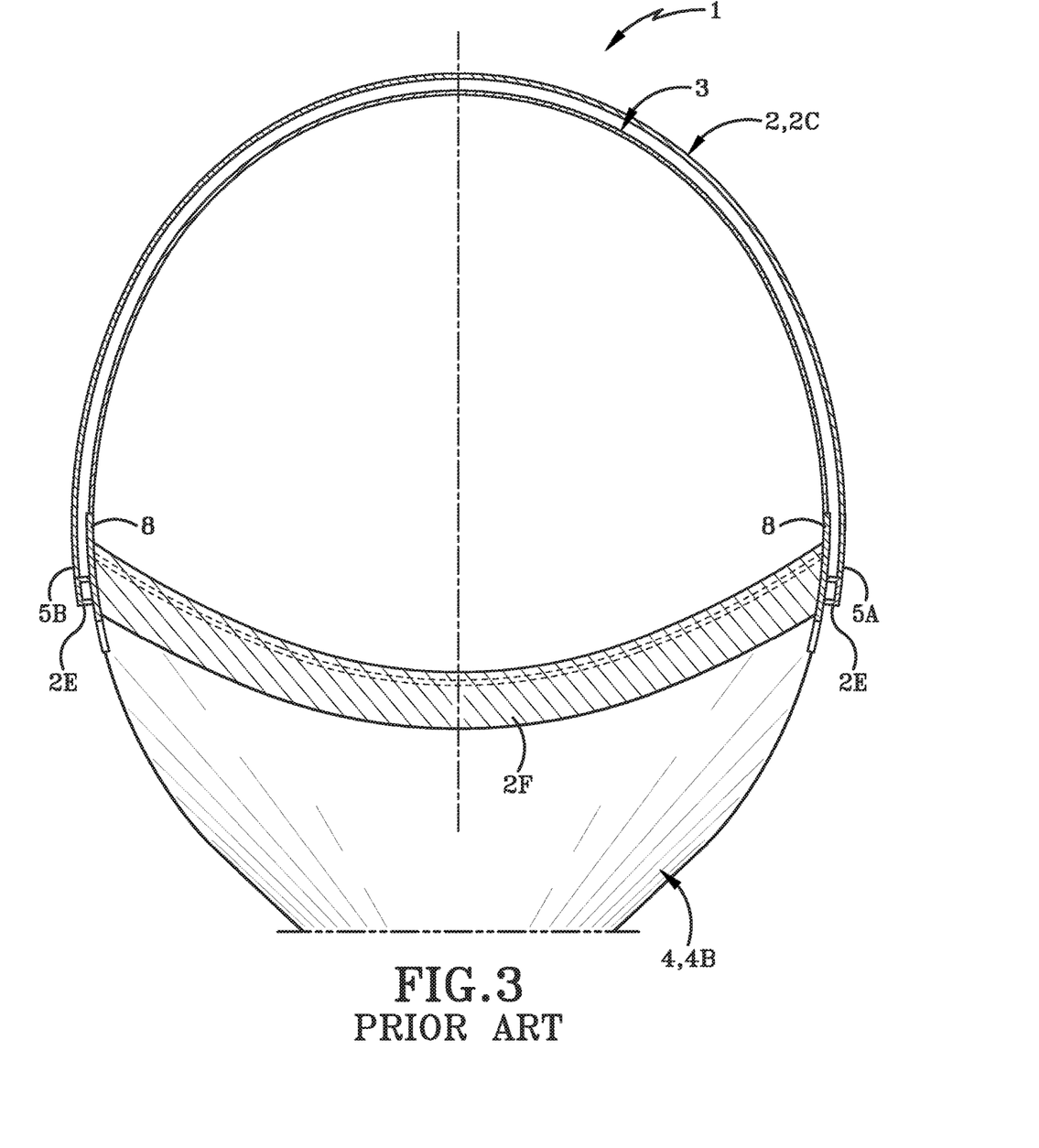
FIG. 3 is a cross section view as taken along 3-3 in FIG. 2.

FIG. 1 and FIG. 2 illustrate a hopper trailer 1 of PRIOR ART which comprises a plurality of ribs 2 around an upper portion 3 and a lower portion 4 of the trailer 1. The lower portion 4 comprises a first lower funnel 4A, a second funnel 4B, and a third funnel 4C. The hopper trailer 1 also includes a front end rib 2A, a rear end rib 2B, a first upper rib 2C, a second upper rib 2D, a horizontal rib 2E, and a first lower rib 2F, a second lower rib 2G. As shown in FIG. 2, the hopper trailer 1 of PRIOR ART includes a first recessed region 6 in which the upper portion 3 and the first and second funnels 4A, 4B meet. Similarly, as shown in FIG. 1, the hopper trailer 1 includes a second recessed region 7 in which the upper portion 3 and the second and third funnels 4B, 4C meet. Both recessed regions 6, 7 are covered with triangular-shaped reinforced plates 8. As depicted in FIG. 1-FIG. 3, the horizontal rib 2E passes over the reinforced plates 8. The rib 2C arcuately extends from a first end 5A to a second end 5B along the surface of the upper portion 3 as shown in FIG. 3. The first end 5A of the first upper rib 2C is fixedly connected to the horizontal rib 2E and the second end 5B of the first upper rib 2C is fixedly connected to the horizontal rib 2E on the opposite side. The first lower rib 2F is fixedly attached between the first funnel 4A and the second funnel 4B. As shown in FIG. 2, the first lower rib 2F and the first upper rib 2C are located on the same axis A. Similarly, the second lower rib 2G and the second upper rib 2D are located on the same axis as well.

Figure 4:
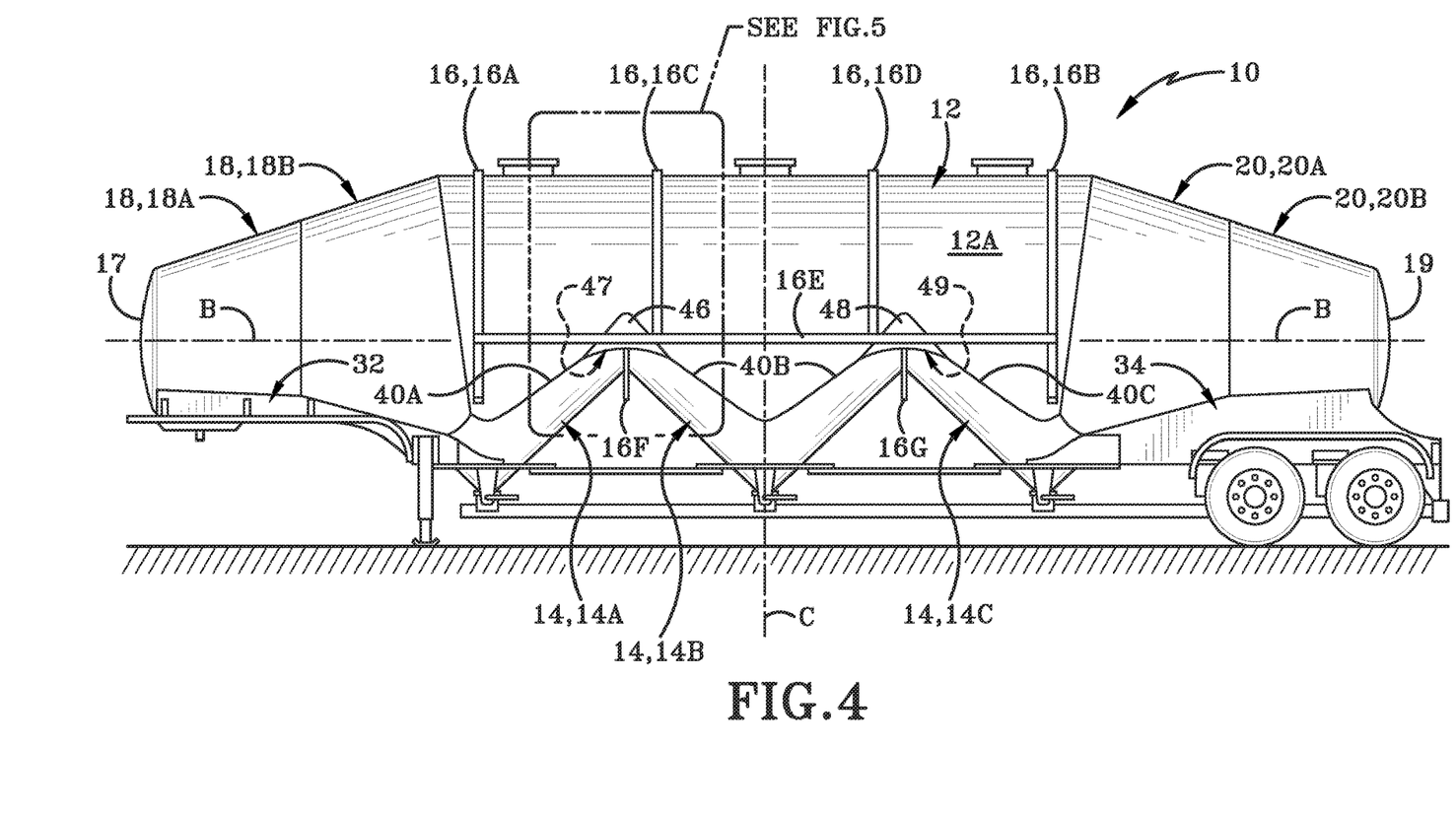
FIG. 4 is a side elevation view of a hopper trailer having an upper portion and a lower portion in accordance with the present disclosure.

FIG. 4 depicts a side elevation view of a hopper trailer 10 in accordance with the present disclosure comprising an upper portion 12, a lower portion 14, and a rib assembly 16.

Moreover, the hopper trailer 10 further comprises a front portion 18 and a rear portion 20. The upper portion 12, the front portion 18, and the rear portion 20 have substantially semi-cylindrical shapes when viewed from the front. A front end 17 of the trailer is positioned forwardly from a rear end 19 of the trailer defining a longitudinal front-to-back direction therebetween.

The front portion 18 comprises defines the front end 17, a first front cover 18A, and a second front cover 18B. The first front cover 18A and the second front cover 18B are metal plates which are substantially bent around a longitudinal axis B so that first ends of both covers 18A, 18B are indirectly coupled near a first side of the front end frame 32 and second ends of both covers 18A, 18B are attached on a second side of the front end frame 32. The front end 17 is fixedly attached with the first front cover 18A along a circumferential edge of the first front cover 18A.

The rear portion 20 comprises a rear end 19, a first rear end cover 20A, and a second rear end cover 20B. The first rear end cover 20A and the second rear end cover 20B are rigid metal plates that are substantially bent around the longitudinal axis B so that the rear end covers 20A, 20B are indirectly coupled near the rear end frame 34. The rear end 19 is fixedly attached with the second end cover 20B along a circumferential edge of the second end cover 20B.

Figure 5:
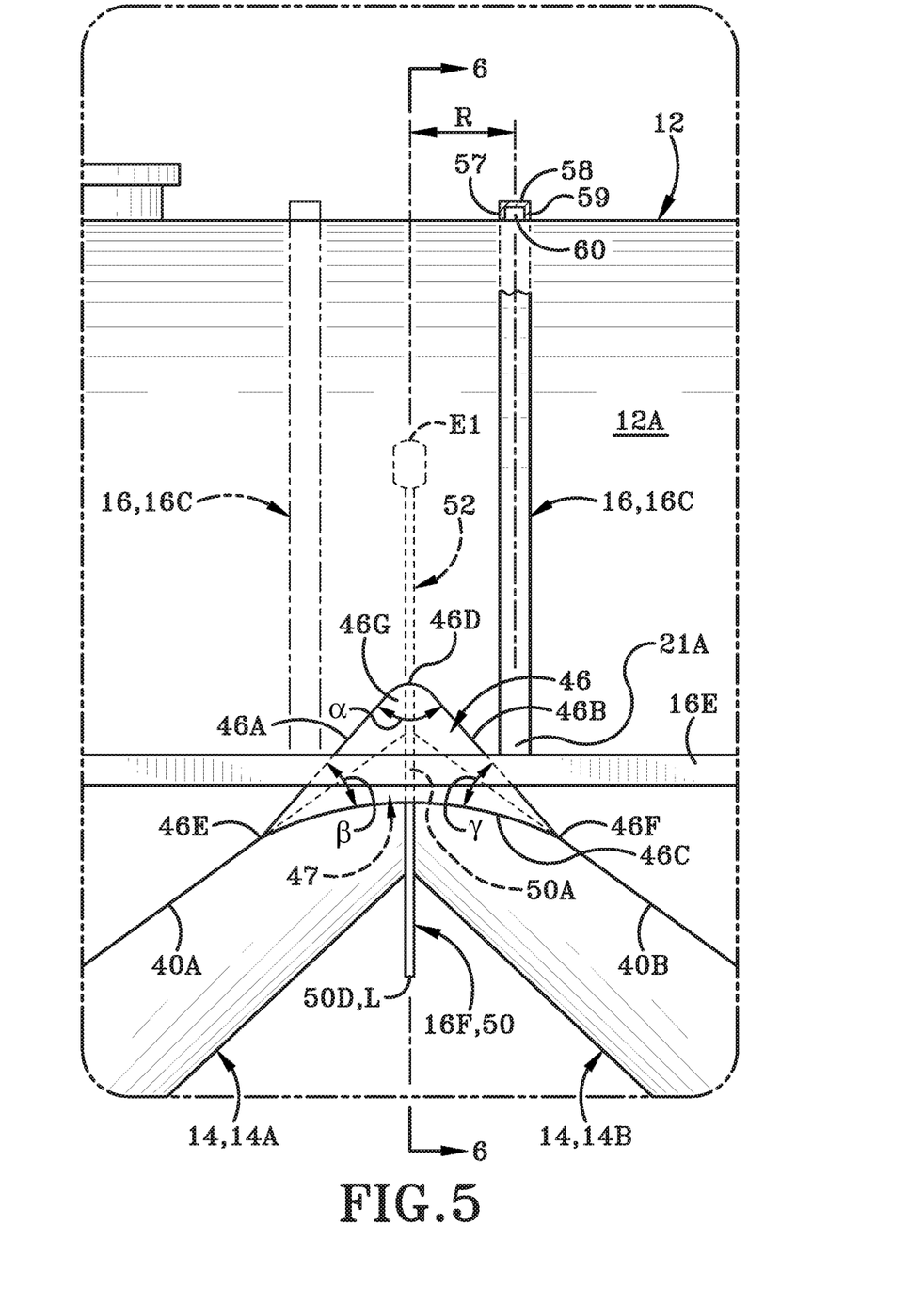
FIG. 5 is an enlarged side elevation view as taken from the region labeled "SEE FIG. 5" in FIG. 4.

The upper portion 12 extends arcuately around the axis B and is rigidly connected with the lower portion 14. The lower portion 14 comprises a first funnel 14A, a second funnel 14B, and a third funnel 14C. Particularly, as shown in FIG. 4 and FIG. 5, a first part of the upper portion 12 is fixedly attached with the first lower funnel 14A along a first slanted seam line 40A. A second part of the upper portion 12 is fixedly welded with the second lower funnel 14B along a second slanted seam line 40B. A third part of the upper portion 12 is fixedly welded with the third lower funnel 14C along a third slanted seam line 40C. The seam lines 40A, 40B, 40C collectively forms a single seam that rigidly joins the upper portion 12 to the lower portion 14.

As depicted in FIG. 4, the first lower funnel 14A is fixedly attached with a front end frame 32, and the third lower funnel 14C is attached with a rear end frame 34. The front end frame 32 of the trailer 10 carries a trailer hitch 22 and a front stopper 24. The rear end frame 34 of the trailer 10 includes a plurality of wheels 26.

Figure 6:
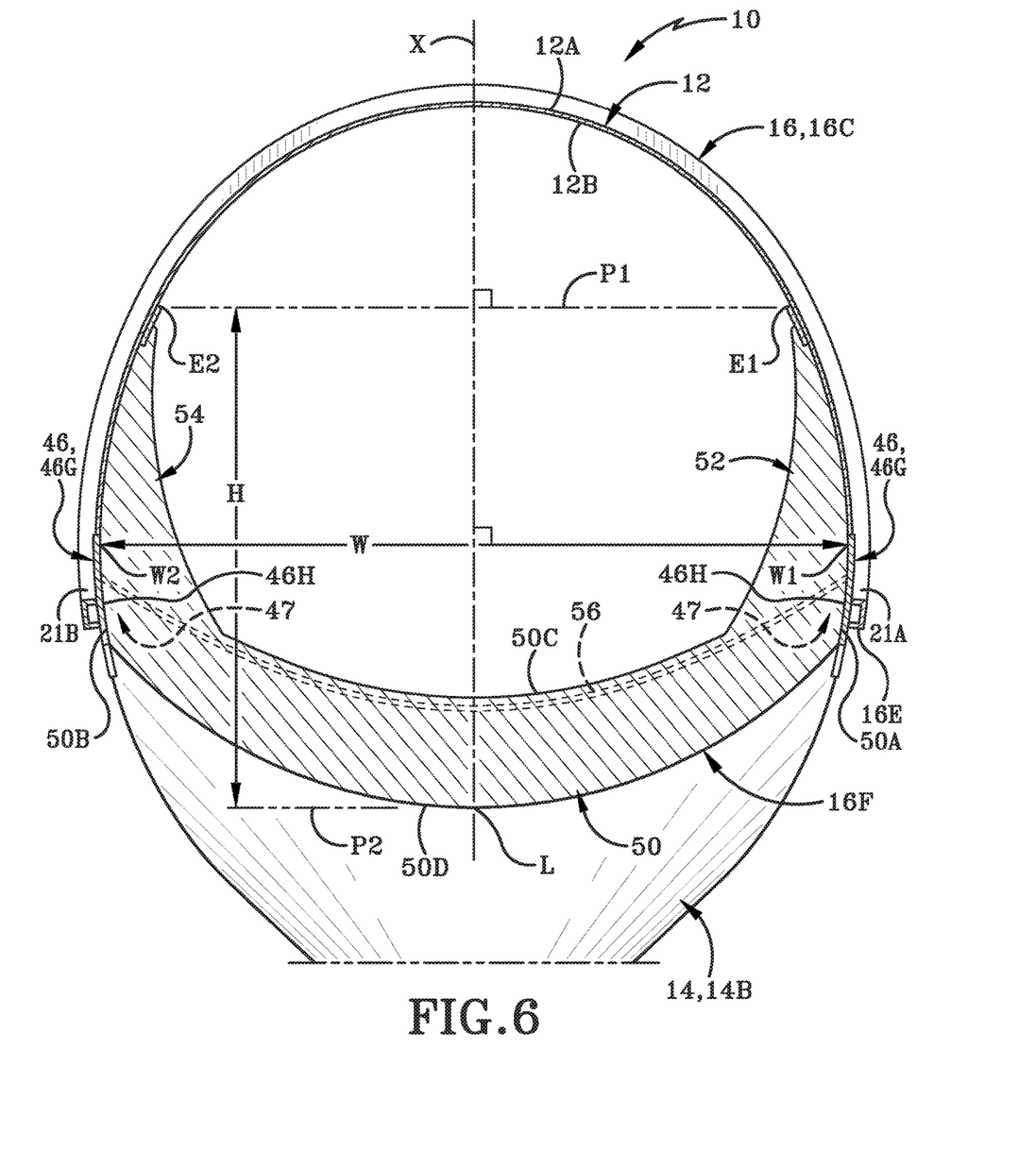
FIG. 6 is a cross section view as taken along 6-6 in FIG. 5.

As depicted in FIG. 4-FIG. 6, the rib assembly 16 comprises a front end rib 16A, a rear end rib 16B, a first upper rib 16C, a second upper rib 16D, a horizontal rib 16E, a first lower rib 16F, and a second lower rib 16G. As shown in FIG. 6, each upper rib 16C, 16D are U-shaped, and the lower ribs 16F, 16G are substantially U-shaped. The front end rib 16A and the rear end rib 16B are parallel and spaced apart from each other substantially parallel to a vertical axis C. Similarly, the two upper ribs 16C, 16D are parallel and spaced apart each other substantially parallel to the axis C. The horizontal rib 16E extends from the front end rib 16A to the rear end rib 16B. The upper ribs 16C, 16D are located between the front end rib 16A and the rear end rib 16B. The front end rib 16A, rear end rib 16B, and upper ribs 16C, 16D are fixedly attached around the upper surface of the upper portion 12 of the trailer. In this particular example, the front end rib 16A, the rear end rib 16B, and the upper ribs 16C, 16D are welded together with the upper surface of the upper portion 12. The front end rib 16A and the rear end rib 16B are fixedly connected with the horizontal rib 16E.

As depicted in FIG. 5 and FIG. 6, the upper ribs 16C, 16D are U-shaped when viewed in cross-section. The upper ribs 16C, 16D comprises a first wall 57, a second wall 58, and a third wall 59. The first wall 57, second wall 58, and the third wall 59 are rigidly connected to define a channel 60. The channel 60 is exterior to the outer surface 12A of the upper portion 12. Bottom surfaces of the first wall 57 and the third wall 59 is operatively attached with the upper portion 12.

As shown in FIG. 6, the upper rib 16C arcuately extends along the upper surface of the upper portion 12. A first end 21A of the upper rib 16C is fixedly connected to the horizontal rib 16E, and a second end 21B of the upper rib 16C is fixedly connected to the horizontal rib 16E which is located on the opposite side.

The lower rib 16F comprises a base member 50, and a first arm 52, and a second arm 54. The base member 50 further comprises a first side edge 50A, a second side edge 50B, an upper edge 50C, and a bottom edge 50D. The base member 50 extends from the first edge 50A to the second edge 50B, and vertically extends from the bottom edge 50D to the upper edge 50C. The upper edge 50C is located above a welding line 56 between the first funnel 14A and the first lower rib 16F and the second funnel 14B and the first lower rib 16F. The welding line 56 is formed where the first funnel 14A and the first lower rib 16F meets or the second funnel 14B and the first lower rib 16F meets. The first arm 52 extends upwardly from a right side of the upper edge 50C of the base member 50 along a right lower surface of the upper portion 12. The second arm 54 upwardly extends from a left side of the upper edge 50C of the base member 50 along a left surface of the upper portion 12.

As depicted in FIG. 6, a height H of the lower rib 16G is defined by the distance between a first plane P1 of the lower rib 16G and a second plane P2 of the lower rib 16G. The first plane P1 is a plane which includes two end points E1, E2. Furthermore, the first plane P1 is perpendicular to a longitudinal middle axis X. The second plane P2 is a plane passing the lowest point L of the lower rib 16F and perpendicular to the axis X. A width W is defined by a maximum distance between a first point W1 and a second point W2 on the upper rib 16C, where the first point W1 and the second point W2 are on the same plane which is perpendicular to the middle axis X. Preferably, in this particular embodiment, the ratio of the height H to the width W is at least equal to 0.67:1. However, in other embodiment the ratio of the height H to the width W is greater than about 0.7:1. It has been empirically determined that the ratio of the height H to the width W must be at least 0.67:1 in order to effectuate stress dissipation along the trailer, specifically the upper portion 12 in accordance with the present disclosure. By making the ratio of the height H to the width W at least 0.67:1, the stresses on the upper portion 12 are reduced from that which occur in a conventional trailer (i.e., prior art trailer 1 shown in FIG. 1).

As depicted in FIG. 4 and FIG. 5, the hopper trailer 10 further includes a set of reinforced plates 46, 48. Particularly, as shown in FIG. 5, the reinforced plate 46 is fixedly attached to the upper portion 12 and the first and second lower funnels 14A, 14B to cover up a recessed region 47. The recessed region 47 is created because the upper portion and the funnels have conical shapes. Similarly, a recessed region 49 is created because the upper portion 12 and two adjacent funnels 14B, 14C have conical shapes as well. The recessed regions 47, 49 are curved in from a surface of the upper portion 12 so that the horizontal rib 16E cannot be fixedly attached on surface of the upper portion 12 as it passes over the recessed regions 47, 49. The reinforced plates 46, 48 cover the recessed regions 47, 49 to create continued flat surface along entire surface of the upper portion 12 so that the horizontal rib 16E is fixedly attached on the upper portion 12 and the plates 46, 48. Furthermore, as shown in FIG. 5 and FIG. 6, an inner surface 46H of the plate 46 is directly abutted with the lower rib 16F along a center line of the plate 46. Particularly, as shown in FIG. 5, the lower rib 16F passes underneath the plate 46 so that the lower rib 16F is not directly attached to the horizontal rib 16E. In one example, rib 16F is welded to inner surface 46H of plate 46.

As shown in FIG. 5 and FIG. 6, an upper portion of the first lower rib 16F is located above the welding line 56 and fixedly attached to the lower surface of the upper portion 12. A lower portion of the first lower rib 16F is located below the welding line 56 and is downwardly and outwardly extended. The rib 16F is sandwiched between the first funnel 14A and the second funnel 14B so that the first funnel 14A is not directly connected with the second funnel 14B. As shown in FIG. 5, the plate 46 partially covers the low portion of the lower rib 16F so that the lower rib 16F passes under the plate 46. Similarly, the second lower rib 16G is sandwiched between the second funnel 14B and the third funnel 14C so that the second funnel 14B is not directly abutted with the third funnel 14C.

As depicted in FIG. 5, the plate 46 is generally triangular shaped. The plate 46 comprises a first edge 46A, a second edge 46B, and a third edge 46C. A first vertex 46D is located where the first edge 46A and the second edge 46B meets and is rounded. The first vertex 46D is the uppermost point or apex of the triangularly shaped plate 46. The first vertex 46D is located substantially coplanar with the lower rib 16F. A second vertex 46E where the first edge 46A and the third edge 46C meets is positioned substantially along the seam line 40A. The second vertex 46E is located at a point where the upper portion 12 meets the lower funnel 14A. Edge 46A extends upwardly and rearwardly from second vertex 46E such that edge 46A only attaches with upper portion 12 and does not attach with lower portion 13.

With continued reference to FIG. 5, a third vertex 46F is positioned where the second edge 46B and the third edge 46C meets is substantially along the seam line 40B and is connected with both the upper portion 12 and the lower funnel 14B. Edge 46B extends upwardly and forwardly from vertex 46F. Edge 46B is connected with upper portion 12 but is not connected with lower portion 14.

The second vertex 46E and the third vertex 46F are offset from the rib 16C. The first edge 46A and the second edge 46B form an angle α which has an acute angle. On contrary, the first edge 46A and the third edge 46C forms an angle β, and the second edge 46B and the third edge 46C forms an angle γ. The angles β and γ are all acute angles. Plate 46 is thicker than the upper portion 12 as depicted in cross section of FIG. 6. Plate 46 includes an outer surface 46G and an opposing inner surface 46H. The inner surface of 46H is directly connected with outer surface 12A of upper portion 12.

FIG. 5 illustrates that the first upper rib 16C is not on the same transverse plane as the first lower rib 16F. The first upper rib 16C is offset and parallel from the first lower rib 16F with a distance R. In this particular example, the first upper rib 16C is offset towards the rear end 19 and spaced apart parallel from the first lower rib 16F. However, in another example, the rib 16C can be offset towards the forward end 17 and spaced apart parallel from the lower rib 16F (as indicated in dashed-lines in FIG. 5). In one embodiment, the offset range or offset distance "R" is in a range from about 5 inches to about 20 inches. In another embodiment, the offset range or offset distance "R" is in a range from about 10 inches to about 15 inches. In another embodiment, the offset distance "R" is about 12.5 inches. As shown in FIG. 5, the upper rib 16C does not cross the reinforced plate 46 so that the upper rib 16C is continuously engaged with a surface of the upper portion 12. However, the upper rib 16C is still perpendicularly connected with the horizontal rib 16E. In one particular embodiment, the upper rib 16C is rigidly connected with an convexly curved outer surface 12A of upper portion 12. However, it is entirely possible for the rib 16C to be connected with an opposite concavely curved inner surface 12B of the upper portion 12.

In one particular embodiment, upper rib 16C does not intersect apex or first vertex 46D of the reinforced plate 46. To the contrary, an example is shown in FIG. 5 where a transverse plane of rib 16C would intersect edge 46B when the rib 16C is offset rearwardly from the plane of the lower rib 16F. Alternatively, a plane of rib 16C could intersect edge 46A when rib 16C is offset forwardly from the plane of lower rib 16F.

The rib assembly can be made out of metal such as aluminum or stainless steel or any hard materials such as reinforced rubber, plastic etc. The first funnel 14A, the second funnel 14B, the third funnel 14C can be fixedly attached by electric welding, arc welding, chemical bonding etc. The upper portion 12 and the first funnel 14A can be fixedly attached by electric welding, arc welding, chemical bonding etc. The upper portion 12 and the second funnel 14B can be fixedly attached by electric welding, arc welding, chemical bonding etc. The upper portion 12 and the third funnel 14C can be fixedly attached by electric welding, arc welding, chemical bonding etc.

It is understood that the upper portion 12, the lower portion 14, and the rib assembly 16 can be fixedly attached each other by any known methods including chemical bonding, electric bonding, or electric welding etc.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

The invention claimed is:

1. A hopper tank trailer comprising:
   an upper portion defining a top of the hopper tank trailer;
   a lower portion including a plurality of hopper funnels fixedly connected beneath the upper portion;
   at least one lower rib sandwiched between adjacent pairs of the hopper funnels; and
   at least one upper rib connected to the upper portion which is offset from the at least one lower rib.

2. The hopper tank trailer in claim 1, wherein the at least one lower rib extends along a first axis; and wherein the at least one upper rib extends along a second axis.

3. The hopper tank trailer in claim 1, wherein the at least one lower rib includes a first lower rib and a second lower rib; wherein the at least one upper rib includes a first upper rib and a second upper rib, the hopper tank trailer further comprising:
   a front end rib;
   a rear end rib; and
   a horizontal rib; wherein the first lower rib, the second lower rib, the first upper rib, the second upper rib, the front end rib, the rear end rib, and the horizontal rib form a rib assembly.

4. The hopper tank trailer in claim 3, wherein the horizontal rib is positioned between first upper rib and the first lower rib.

5. The hopper tank trailer in claim 3, wherein the horizontal rib is connected to the first upper rib, the second upper rib, the front end rib and the rear end rib.

6. A hopper tank trailer comprising:
   an upper portion defining a top of the hopper tank trailer;
   a lower portion including a plurality of hopper funnels fixedly connected beneath the upper portion;
   at least one lower rib sandwiched between adjacent pairs of the hopper funnels; and
   at least one upper rib connected to the upper portion which is offset from the at least one lower rib; and an offset distance between the at least one upper rib and the at least one lower rib in a range from 5 inches to 20 inches.

7. The hopper tank trailer in claim 6, wherein the offset distance is in a range from 10 inches to 15 inches.

8. The hopper tank trailer in claim 7, wherein the offset distance is about 12.5 inches.

9. The hopper tank trailer in claim 6, wherein the at least one lower rib includes a top end and a bottom end which defines a height therebetween, and includes a left end and a right end which defines a width therebetween.

10. The hopper tank trailer in claim 6, wherein the upper portion and two hopper funnels form a recessed region, wherein the recessed region is covered with a reinforced plate.

11. The hopper tank trailer in claim 10, further comprising:
   a horizontal rib fixedly attached on the upper portion that passes over the reinforced plate.

12. The hopper tank trailer in claim 11, wherein the horizontal rib is oriented perpendicularly to the at least one upper rib.

13. The hopper tank trailer in claim 6, wherein the at least one lower rib extends along a first axis; and wherein the at least one upper rib extends along a second axis.

14. The hopper tank trailer in claim 6, wherein the at least one lower rib includes a first lower rib and a second lower rib; wherein the at least one upper rib includes a first upper rib and a second upper rib, the hopper tank trailer further comprising:
- a front end rib;
- a rear end rib; and
- a horizontal rib; wherein the first lower rib, the second lower rib, the first upper rib, the second upper rib, the front end rib, the rear end rib, and the horizontal rib form a rib assembly.

15. A hopper tank trailer comprising:
- an upper portion defining a top of the hopper tank trailer;
- a lower portion including a plurality of hopper funnels fixedly connected beneath the upper portion;
- at least one lower rib sandwiched between adjacent pairs of the hopper funnels; wherein the at least one lower rib includes a top end and a bottom end which defines a height therebetween, and includes a left end and a right end which defines a width therebetween; and
- at least one upper rib connected to the upper portion which is offset from the lower rib; wherein a ratio of the height to the width is at least 0.67:1.

16. The hopper tank trailer in claim 15, wherein the upper portion and two hopper funnels form a recessed region, wherein the recessed region is covered with a reinforced plate.

17. The hopper tank trailer in claim 16, further comprising:
- a horizontal rib fixedly attached on the upper portion that passes over the reinforced plate.

18. The hopper tank trailer in claim 17, wherein the horizontal rib is oriented perpendicularly to the at least one upper rib.

19. The hopper tank trailer in claim 15, wherein the at least one lower rib extends along a first axis; and wherein the at least one upper rib extends along a second axis.

20. The hopper tank trailer in claim 15, wherein the at least one lower rib includes a first lower rib and a second lower rib; wherein the at least one upper rib includes a first upper rib and a second upper rib, the hopper tank trailer further comprising:
- a front end rib;
- a rear end rib; and
- a horizontal rib; wherein the first lower rib, the second lower rib, the first upper rib, the second upper rib, the front end rib, the rear end rib, and the horizontal rib form a rib assembly.

* * * * *